Jan. 29, 1957 W. S. BRINK 2,779,629
WHEEL
Filed Sept. 12, 1955 3 Sheets-Sheet 2
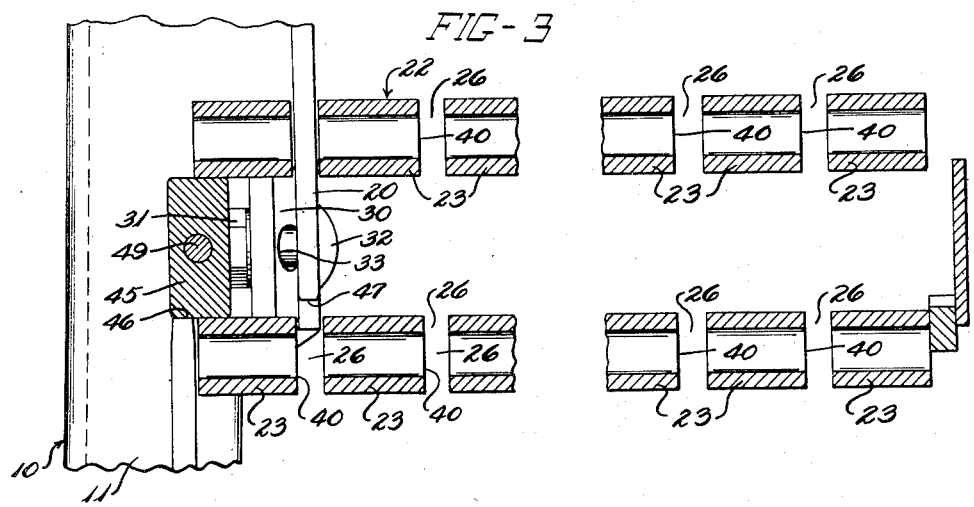
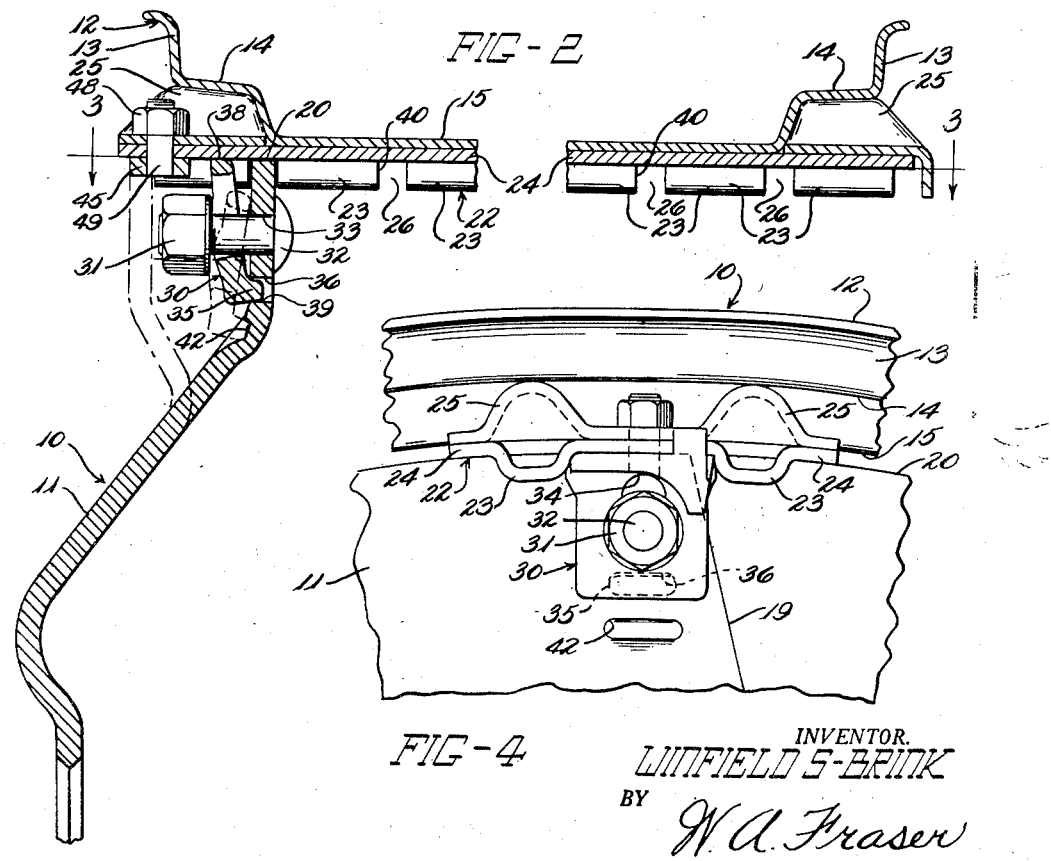
INVENTOR.
WINFIELD S. BRINK
BY
W. A. Fraser
ATTY.

Jan. 29, 1957 W. S. BRINK 2,779,629
WHEEL
Filed Sept. 12, 1955 3 Sheets-Sheet 3
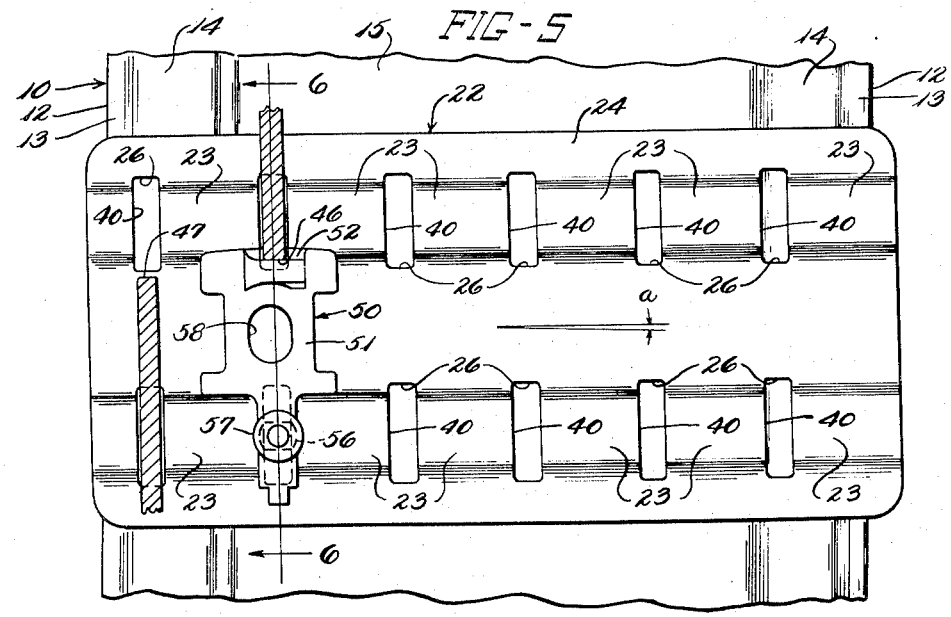
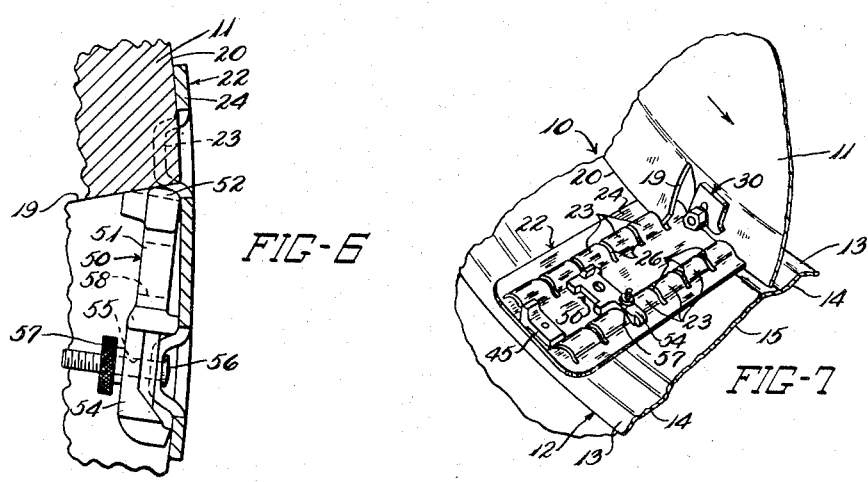
INVENTOR.
LINFIELD S. BRINK
BY
W. A. Fraser
ATY.

United States Patent Office 2,779,629
Patented Jan. 29, 1957

2,779,629

WHEEL

Winfield S. Brink, Akron, Ohio, assignor to The Firestone Tire & Rubber Company, Akron, Ohio, a corporation of Ohio Application September 12, 1955, Serial No. 533,846

10 Claims. (Cl. 301—9)

This invention relates to tractor wheels and more particularly to a rear wheel construction which enables the spacing of the wheels to be varied.

This application is a continuation-in-part of my pending application Serial No. 406,676 filed January 28, 1954, now Patent No. 2,755,138. Like the adjustable tractor wheel shown and described in that application, the present invention provides a rim portion which is axially movable with respect to the supporting central disc portion of the wheel. In the present case the rim has a plurality of notched bars associated in pairs and spaced about the inner circumference of the rim in such a manner that the notches in the bars provide paths for the helical outer edge of the disc. When the wheels are rotated, the reaction between the disc and the bars produces the desired axial movement of the rims on the disc and the spacing of the wheels is accordingly varied.

Several advantages result from grouping the notched bars in pairs. First, a greater bearing surface is provided between the rim and the disc, both for wheel adjustment and for clamping the rim and disc parts together after the wheel adjustment has been made. Second, the close spacing of the bars forming a pair, enables an improved clamp to be used in combination therewith and, as a result, a more secure clamping action is obtained. Lastly, the arrangement enables the clamps to act as driving members thereby minimizing slippage between the rim and the wheel disc during normal operation of the tractor.

It is, accordingly, a general object of the invention to provide a novel wheel construction for agricultural tractors and the like, which enables an adjustment of the wheel spacing over a relatively wide range.

Another object is to provide a tractor wheel construction in which the wheel spacing may be adjusted by utilizing the power of the rear axle.

A more specific object is to provide a tractor wheel construction comprising two relatively movable rim and disc parts whereby rotation of the disc within the rim will cause an axial adjustment of the rim position.

Another object is to provide a tractor wheel having relative movable parts whose axial positions may be adjusted with respect to each other together with effective clamping means which may be conveniently and quickly operated, and which minimizes slipping between the parts.

Yet another object is to provide a tractor wheel with relatively movable rim and disc parts and with effective stop means associated therewith to limit the relative movements of such parts.

Other objects are to provide a wheel of the type described which is strong and simple in design, which is reliable in operation and which is virtually free from jamming or clogging.

These and other objects and advantages will be more fully apparent from the following description of a preferred form of the invention in which:

Figure 2 is a sectional view of a portion of the wheel of Figure 1, the view being taken in the radial plane indicated by the lines 2—2 of Figure 1 and the scale being considerably larger than that of Figure 1;

Figure 3 is a sectional view taken in the horizontal plane indicated by the lines 3—3 of Figure 2;

Figure 4 is a fragmentary side elevation of a portion of Figure 2 showing particularly one of the clamping members and also a stop member in position on the wheel;

Figure 5 is an elevation of one of the notched bar assemblies showing a stop member in position engaging the wheel disc, which is shown in section;

Figure 6 is a sectional view, taken in the plane indicated by the lines 6—6 of Figure 5, and showing the manner in which the stop member is held in position relative one of the notched bar assemblies; and Figure 7 is a perspective view of a portion of the wheel of Figure 1 showing a stop member and a clamp member in position on the wheel.

Figure 1:
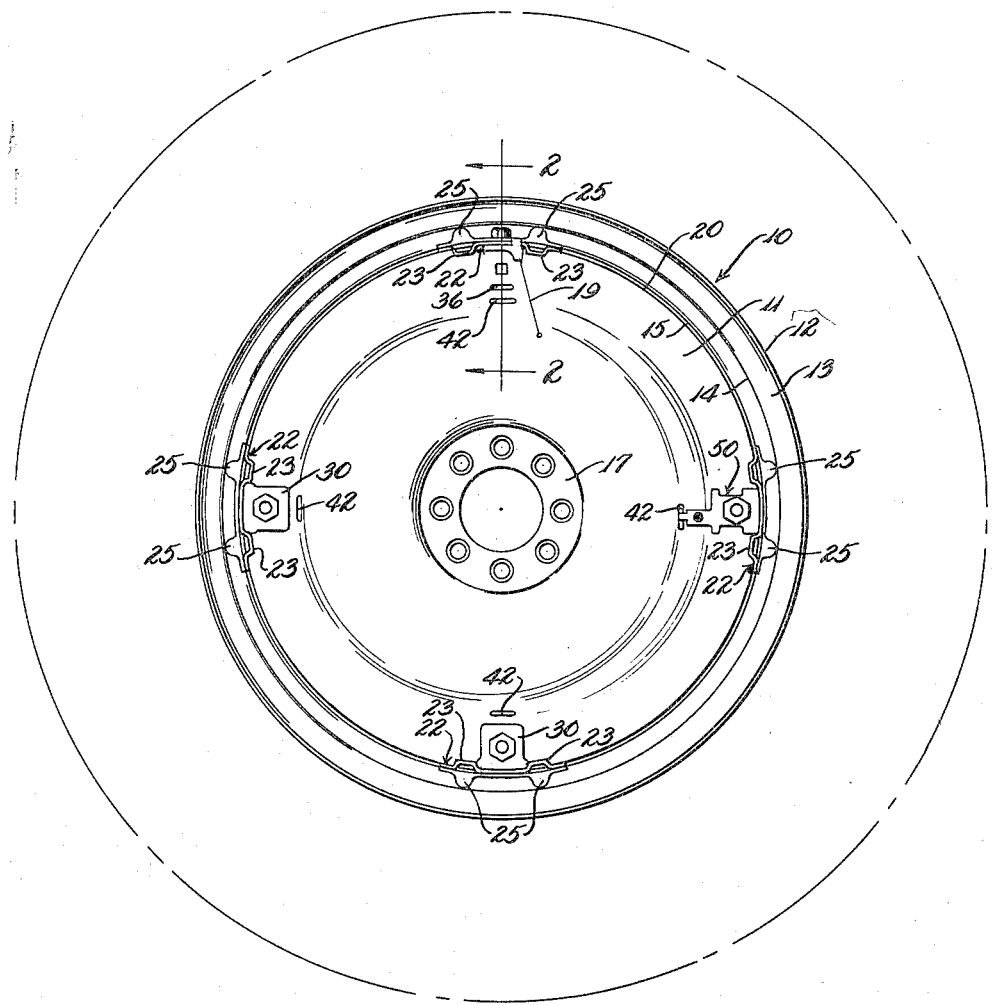
Figure 1 is a side elevation of a rear tractor wheel embodying the invention.

Referring first to Figure 1, a tractor wheel 10 embodying the invention generally comprises two relatively movable parts, a disc portion, indicated at 11, and a rim portion indicated at 12. Normally clamps hold the two parts together to act as an integrally functioning wheel but the clamps may be released so that the relative axial position of the rim can be adjusted with respect to the disc to provide the desired wheel spacing. The arrangement is such that rotation of the disc portion by applying power to the rear axle of a tractor in one direction will cause the rim portion to move outwardly on the disc toward a position of greater wheel spacing, while reversing the power will pull the rim inwardly toward a position of closer wheel spacing.

The rim 12 which is of conventional drop center construction comprises the side flanges 13, tire bead seats 14 and a drop center well 15. The disc portion, except for the modification required by the present invention, is also of conventional design comprising a hub 17 by which the disc is removably secured to the driving axle of the tractor and the disc portion 11 which is secured to the hub and which provides support for the rim of the wheel. The disc 11 is preferably formed from sheet steel of suitable thickness so as to have the required strength and rigidity, but of course it may also be of cast metal.

In conventional wheel constructions the outer edge of the disc portion generally lies in a single plane so that the edge describes a true circle. In the present invention the disc body is partially split as indicated in 19 and its peripheral edge 20 is offset uniformly around the circumference of the body so as to describe a single turn of a helix.

A track in which the helical edge 20 rides is provided by four notched bar brackets 22 which are welded or otherwise firmly secured to the inner circumference of the rim at 90° intervals. The brackets, except for certain features which will be discussed later, are generally identical in construction and only one will be described in detail. It will be observed particularly from Figures 2 and 5 that each of the brackets has a pair of circumferentially spaced tubular or bar portions 23 which project radially inwardly from the base 24 of the bracket. The base is slightly curved to fit the rim and is spot welded at a suitable number of points to the bottom wall of the drop center well of the rim. Preferably each base also has a pair of stamped bosses 25 which extend radially outwardly on each side of the drop center well to contact and support the bead seats 14 of the rim. Each notched bar bracket 22 thus contacts and supports the rim in a manner to provide a strong and rigid mounting for the rim on the disc. Although in the present example four notched bar brackets are shown spaced about the rim it is apparent that any convenient number of brackets may be used.

As will be observed particularly from Figure 5, the bars 23 of the brackets each have a plurality of notches 26 which are cut through the bars 23 as far as the bases of the brackets. Six such notches are shown in the present example. In order to align the notches in a helical path so that they will receive the edge 20 of the disc, the brackets 22 are welded to the rim at a slight angle to the axis of the rim as indicated at $a$ in Figure 5, and the notches in each bar are spaced apart by a distance equal to the pitch of the helix which is described by the disc edge 20. It should be noted that while the notched bars in each bracket are virtually identical, the notched bars in the various brackets are not identical but differ in one respect. In order that each of the bars will receive the helical disc edge 20 it is necessary that the notches 26 of the bars of adjacent brackets be displaced uniformly by an amount equal to ¼ of the pitch of the edge 20. Furthermore, the displacement by this amount must be in the same direction and must be progressive from bracket to bracket around the periphery of the rim. This feature places the notches in a helical path providing an effective engagement between the disc edge 20 and the notches 26 about the periphery of the wheel for all axial positions of the disc and the rim. The clearances between the disc edge and the notches enable the disc edge to fit within the bars making up a pair, without the necessity of displacing the corresponding notches in the two bars.

In use, the rear wheels 10 are mounted on a tractor with the helices of the disc edge and notched bars of the right wheel extending oppositely to those of the left wheel. When power is applied to the rear axle the disc portion 11 of each wheel will tend to turn within its rim 12 and by virtue of the engagement of the helical disc edge 20 with the notched bars 23 an axial thrust will be transmitted to the rim to move it inwardly or outwardly depending upon the direction of the application of the power to the axle. For example, in Figure 7, if the wheel is driven counterclockwise, as viewed, the rim portion 12 will be drawn inwardly to the right. Since there are six notches 26 provided in the bars 22, five complete rotations of a disc portion 11 relative to the rim 12 will move the wheel in an axial direction by a distance slightly smaller than the width of the rim. Proportionally fewer numbers of rotations will result in a correspondingly smaller axial adjustment of the rim on the disc. One relative rotation will move the rim approximately one-sixth of the rim width, a distance equal to the pitch of the helix; in this example, about 1 inch.

The adjustment of the wheel spacing referred to above is accomplished only when the rim and disc portions of the wheel are free to move relative to each other. During regular operation of the tractor it is necessary that the wheel spacing be held constant and, as mentioned above, this is accomplished by clamping means which hold the disc and rim together so that during operation the parts will function as an integral wheel.

The clamping means takes the form of individual members 30, each of which is removably secured to the disc edge 20 by means of a nut 31 and a bolt 32 which passes through a drilled hole 33 in the disc edge and through an elongated slot 34 in the member 30. Each member 30 is essentially rectangular in shape having a width which enables its outer end to fit snugly between the bars 23 of the bracket 22, see Figure 4. Each of the clamps has a lug portion 35 at its radially inner end which is adapted to fit loosely in a hole 36 in the disc, see particularly Figures 2 and 3. The length of the clamp in the radial direction, is somewhat longer than the distance of the hole 36 from the edge of the disc, as best indicated in Figure 2.

In order to clamp the rim and disc portions together after the desired wheel adjustment has been effected, four clamps 30 are positioned with their lugs 35 inserted in holes 36 and with the clamps fitting between the bars of each bracket respectively. When the nuts 31 are drawn tight upon the bolts the clamps pivot about the lugs 35 in a clockwise movement, as viewed in Figure 2, until the radially outer edges 38 of the clamps strike the bases 24 of the brackets. Further tightening of the nut on the bolt causes each clamp to act as a toggle exerting force in the radial direction upon the rim, thrrough the bracket base 24, and upon the wheel disc, through the surfaces 39 of the holes 36 which receive the clamping lugs, see Figure 2. When the clamps 30 are tightened at all four brackets the rim will be securely "chucked" upon the wheel disc. It should also be noted that when the nuts 31 are drawn tight upon the clamps the edge 20 of the disc will be pulled against the surfaces 40 of the notches and as a result there will be an effective axial clamping between the rim and disc parts.

By virtue of the relatively snug fit of the clamps 30 between the notched bars of each bracket, slippage between the disc and the rim during operation is minimized, for with the slightest slipping movement the clamps 30 will contact one or the other of the adjacent notched bars, depending upon the direction of rotation of the wheel, and thereafter the clamps will act as driving members imparting torque to the rim.

When the wheels are to be adjusted the clamps are released by loosening the nuts 31. The clamps are then tilted so that the lugs 35 can be removed from the holes 36. Each clamp is then moved radially inwardly until it takes the position shown in dotted lines in Figure 2 with the lug 35 fitting in a recess 42 in the disc. The radially extending slot 34 in the clamp permits this retracting radial movement. When the clamps are in the dotted line position, the nuts are tightened slightly to hold the clamps in place so that they cannot interfere with the adjusting movement of the disc edge 20 through the notched bar brackets.

The rim is prevented from moving bodily off the disc during the adjustment of the wheel spacing by means of stop members 45 which block the extreme inner and outer notches 26 respectively of one of the bars and which act as abutments for the free ends 46 and 47 of the disc edge. When a disc edge makes abutting contact with either stop, further relative rotation of the disc within the rim is blocked. The stops thus set the extreme limits to the relative rotational and axial movements of the disc and rim parts. The stops are removably secured to the brackets by nuts 48 and bolts 49 so that they can be removed to permit assembly and disassembly of the wheel.

When it is desired to adjust the wheel to positions intermediate the extreme positions determined by stops 45, a stop of slightly different design is preferred. Such a stop is indicated generally at 50 and, as shown in Figures 5 and 6, comprises a body portion 51 which fits snugly between the notched bars of a bracket, with one end 52 abutting one of the bars and blocking the adjacent notch to provide an abutment for the edge 20 of the disc and with its other end 52 positioned against the other bar of the bracket. The stop 50 is automatically positioned in place between the bars and is secured to the wheel by means of a curved arm 54 which extends from the body of the stop and which fits over the adjacent notched bar. The arm is drilled as indicated at 55 and is provided with a nut and bolt arrangement which enables it to be removably secured to the notched bar bracket, the bolt having an elongated head 56 which in one position can be inserted through the notch and which then can be turned 90° so that it cannot be pulled back through the notch. When the nut 57 is tightened it will clamp the bolt head against the surfaces on each side of the notch. To remove the stop from the wheel, the nut 57 is loosened, the bolt is turned 90° and the head 56 is withdrawn through the notch. It will be observed that the body portion of the stop is identical to the clamping member 30 described above, being provided with a slot 58 enabling the stop to be used as a clamping member if desired.

The invention has the advantages of simplicity and convenience. The construction is economical to manufacture and is strong and effective for the most demanding service. It enables a wide range of wheel spacing to be obtained, particularly since the construction enables the wheels to be reversed. The use of the spaced bars 23 of limited circumferential extent makes the construction virtually self-cleaning with little danger of clogging and jamming. The method of clamping the rim and disc parts together and the method of limiting the adjusting movement of the parts are particularly effective. They are convenient and easy to use and have proven successful in the field.

Various modifications and changes will no doubt occur to those skilled in the art without departing from the spirit and scope of the invention, the essential features of which are summarized in the claims below.

I claim:

1. In a wheel construction adapted to provide a variable wheel spacing for an agricultural tractor and the like, a disc and a rim mounted thereon, said disc comprising a hub adapted to mount said wheel on the axle of said tractor and a disc body secured to said hub and terminating in an outer helical edge, a plurality of notched bars arranged in pairs about the periphery of said rim and extending axially across and secured to the inner surface of said rim, said bars having corresponding notches lying in a helical path having a pitch equal to said pitch of said helical edge to receive said edge for sliding movement therein, whereby relative rotation of said disc and rim results in axial movement of said rim on said disc, and a plurality of clamps each having its radially outer end fitting snugly between the bars making up a said pair and means to draw said outer ends of said clamping members in arcuate paths into contact with the radially inner surface of said brackets to bring said outer ends in position to exert a radial chucking force thereon.

2. The wheel construction of claim 1 having pockets formed in said wheel disc, said clamps have lug portions extending into said pockets and rotate about the edges of said pockets.

3. The wheel construction of claim 2 in which said clamps between said lugs and said outer ends are appreciably longer than the distance of said pockets from said disc edge.

4. The wheel construction of claim 3 in which means to rotate said clamping members comprise bolts extending through said clamping members and through said disc and nuts threaded on said bolts to pull said disc and said clamping members axially toward each other.

5. In a wheel construction adapted to provide a variable wheel spacing for an agricultural tractor and the like, a disc and a rim mounted thereon, said disc comprising a hub adapted to mount said wheel on the axle of said tractor and a disc body secured to said hub and terminating in an outer helical edge, a plurality of brackets circumferentially spaced about the inner surface of said rim and secured thereto, each bracket comprising a base portion conforming to said rim and a pair of relatively closely spaced notched bars integral with said base and extending axially across said rim, the corresponding notches of said bars lying in a helical path having a pitch equal to said pitch of said helical edge to receive said edge for sliding movement therein, whereby relative rotation of said disc and rim results in axial movement of said rim on said disc.

6. The wheel construction of claim 5 and lug portions integral with said brackets at each end thereof extending radially outwardly to contact and support the bead seats of said rim.

7. The wheel construction of claim 5 in which said brackets comprise stamped members and in which said bars comprise substantially semi-cylindrical portions extending radially inwardly from the base of said brackets.

8. In a wheel construction adapted to provide a variable wheel spacing for an agricultural tractor and the like, a disc and a rim mounted thereon, said disc comprising a hub adapted to mount said wheel on the axle of said tractor and a disc body secured to said hub and terminating in an outer helical edge, a plurality of notched bars arranged in pairs about the periphery of said rim and extending axially across and secured to the inner surface of said rim, the corresponding notches of said bars lying in a helical path having a pitch equal to said pitch of said helical edge to receive said edge for sliding movement therein, whereby relative rotation of said disc and rim results in axial movement of said rim on said disc, and a stop fitting between the bars of one of said pairs and secured thereto in a position to block one of said notches and to provide an abutment for the end of said helical edge extending through said notch.

9. The wheel construction of claim 8 in which said stop has a curved portion overlying one of the notches in one bar and means extending through said stop and through said notch to secure said stop member removably to said bracket.

10. The wheel construction of claim 9 in which said last-named means comprises a bolt with an elongated head having a width less than the width of said notch and having a length substantially greater than the width of said notch and a nut threaded on said bolt.

References Cited in the file of this patent
UNITED STATES PATENTS

| | | |
|---|---|---|
| 2,417,139 | Strehlow | Mar. 11, 1947 |
| 2,432,385 | Court | Dec. 9, 1947 |